(12) United States Patent
Jain et al.

(10) Patent No.: US 6,889,110 B1
(45) Date of Patent: May 3, 2005

(54) OPERATIONAL LISTS FOR SIMULTANEOUS WAFER SCHEDULING AND SYSTEM EVENT SCHEDULING

(75) Inventors: Jaideep Jain, San Jose, CA (US); Stanley P. Liu, Milpitas, CA (US); Janet Yi, Campbell, CA (US); Eileen A. H. Wong, Cupertino, CA (US); Sofya B. Malitsky, Mountain View, CA (US); Thomas Hentschel, Discovery Bay, CA (US)

(73) Assignee: Novellus Systems, Inc., San Jose, CA (US)

( * ) Notice: Subject to any disclaimer, the term of this patent is extended or adjusted under 35 U.S.C. 154(b) by 752 days.

(21) Appl. No.: 09/677,087

(22) Filed: Sep. 29, 2000

Related U.S. Application Data

(60) Provisional application No. 60/157,253, filed on Oct. 1, 1999.

(51) Int. Cl.$^7$ ............................................. G06F 19/00
(52) U.S. Cl. ........................ 700/121; 700/23; 700/100; 700/218
(58) Field of Search .............................. 700/11, 12, 23, 700/100, 121, 218

(56) References Cited

U.S. PATENT DOCUMENTS

| | | | |
|---|---|---|---|
| 5,024,570 A | | 6/1991 | Kiriseko et al. |
| 5,751,580 A | | 5/1998 | Chi |
| 6,101,419 A | * | 8/2000 | Kennedy et al. ............... 700/3 |
| 6,122,566 A | | 9/2000 | Nguyen et al. |
| 6,201,998 B1 | | 3/2001 | Lin et al. |
| 6,201,999 B1 | | 3/2001 | Jevtic |
| 6,374,144 B1 | * | 4/2002 | Viviani et al. ................ 700/12 |
| 6,397,111 B1 | | 5/2002 | Niwa |
| 6,560,507 B1 | * | 5/2003 | Malitsky et al. ............ 700/213 |
| 6,665,584 B1 | * | 12/2003 | Malitsky et al. ............ 700/218 |

* cited by examiner

*Primary Examiner*—Leo Picard
*Assistant Examiner*—Douglas S. Lee
(74) *Attorney, Agent, or Firm*—Okamoto & Benedicto LLP

(57) ABSTRACT

A scheduler handles the various tasks to be performed on a wafer processing system as operations, with each operation having a predefined data structure. Operations that meet a set of requirements are added to an operation list. In the operation list, operations meeting another set of requirements are switched to the active state. Each active operation in the operation list is scheduled to run on the wafer processing system. Using structured operations to perform various tasks improves the extensibility and maintainability of the present scheduler. Further, the present scheduler can schedule several compatible operations at the same time by going through each operation in the operation list, and running those that are in the active state.

13 Claims, 12 Drawing Sheets

OPERATIONAL LISTS FOR SIMULTANEOUS WAFER SCHEDULING AND SYSTEM EVENT SCHEDULING

CROSS-REFERENCE TO RELATED APPLICATION

This application claims priority on and incorporates by reference in its entirety U.S. Provisional Application No. 60/157,253, entitled "OPERATIONAL LISTS FOR SIMULTANEOUS WAFER SCHEDULING AND SYSTEM EVENT SCHEDULING," filed on Oct. 1, 1999, by Jaideep Jain, Stanley P. Liu, Janet E. Yi, Eileen A. H. Wong, Sophia B. Malitsky, and Thomas Hentschel.

BACKGROUND OF THE INVENTION

1. Field of the Invention

This invention generally relates to semiconductor wafer processing systems, and more particularly to methods and associated apparatus for scheduling the processing of semiconductor wafers.

2. Description of the Background Art

Semiconductor devices are fabricated using specialized wafer processing systems, which typically have several modules for performing various operations on a wafer. FIG. 1A shows a schematic diagram of an exemplary wafer processing system 100 in the prior art. System 100 has several modules including modules 101–106. A robot 107, which is part of a transfer module not specifically shown, is used to move wafers from one module to another. System 100 further includes a computer 111 and a data acquisition and control system 112 for controlling various control elements 113 (e.g., valves, relays, robots, gates, sensors, heaters, motors, etc.) utilized in the modules of system 100.

An example wafer processing run is now described. A wafer cassette containing several wafers is loaded in a cassette station module 101. Robot 107 picks up a wafer from the wafer cassette and moves the wafer into aligner module 103. In aligner 103, the physical orientation of the wafer is properly adjusted prior to the wafer's subsequent movement to other modules. The wafer is then transferred to a bake module 104, where the wafer is pre-heated prior to being placed in a CVD process module 105 (or CVD process module 106). In CVD process module 105, a film of processing material is deposited on the wafer. System 100 can also accommodate other types of process modules including physical vapor deposition, etching, evaporation, and electro-deposition modules to name a few. Because newly processed wafers can reach temperatures that are high enough to melt a wafer cassette, the wafer coming out of CVD process module 105 is first cooled in a cooling station module 102 before being returned to its wafer cassette in cassette station 101. The just described processing run is repeated for all wafers in cassette station 101.

The movement and processing of each wafer in system 100 are performed in accordance with a list of instructions, commonly known as a recipe, running on computer 111. FIG. 1B shows a recipe 108 for a first wafer, a recipe 109 for a second wafer, and a recipe 110 for a third wafer. In accordance with recipe 108, the first wafer is aligned in aligner 103 (see FIG. 1A), pre-heated in bake module 104, processed in CVD process module 105, and cooled in cooling station 102. The recipe for the second wafer, recipe 109, is similar to recipe 108 except that the second wafer is processed in CVD process module 106 instead of CVD process module 105. Recipe 110 is also similar to recipe 108 except that the third wafer is processed in either CVD process module 105 or CVD process module 106 after going through bake module 104.

A "scheduler" coordinates the running of recipes in a wafer processing system. A typical scheduler allows only one recipe to run at any given time. For example, while wafers which use recipe 108 are being processed, wafers which use other recipes will not be scheduled for processing until the completion of recipe 108. To increase the throughput of the wafer processing system, it is desirable to have a scheduler with the capability to schedule multiple, compatible recipes to run at the same time. Advantageously, such a scheduler should also be extensible and easy to maintain.

SUMMARY

The present invention relates to a method and associated apparatus for scheduling the processing of semiconductor wafers.

In one embodiment, a scheduler handles the various tasks to be performed on a wafer processing system as operations, with each operation having a predefined data structure. Operations that meet a set of requirements are added to an operation list. In the operation list, operations meeting another set of requirements are switched to the active state. Each active operation in the operation list is scheduled to run on the wafer processing system.

Using structured operations to perform tasks improves the extensibility and maintainability of the present scheduler. Because the scheduler will work with any operation that conforms to the predefined data structure, new operations can be introduced without having to make changes to the scheduler itself. Further, functionality that is common to all operations can be incorporated in the scheduler rather than the individual operations. This simplifies the maintenance of the scheduler not only by reducing the number of lines of codes that have to be supported, but also by allowing the scheduler to be isolated from an operation during troubleshooting sessions.

The present scheduler can schedule several compatible operations at the same time by going through each operation in the operation list, and running those that are in the active state. To efficiently coordinate multiple active operations, operations that can complete their designated actions are allowed to finish, while operations that are idly waiting are taken out of turn.

These and other features and advantages of the present invention will be readily apparent to persons of ordinary skill in the art upon reading the entirety of this disclosure, which includes the accompanying drawings.

BRIEF DESCRIPTION OF THE DRAWINGS

The same label appearing in different drawings indicates the same or like elements.

DETAILED DESCRIPTION

Overview

Figure 2:
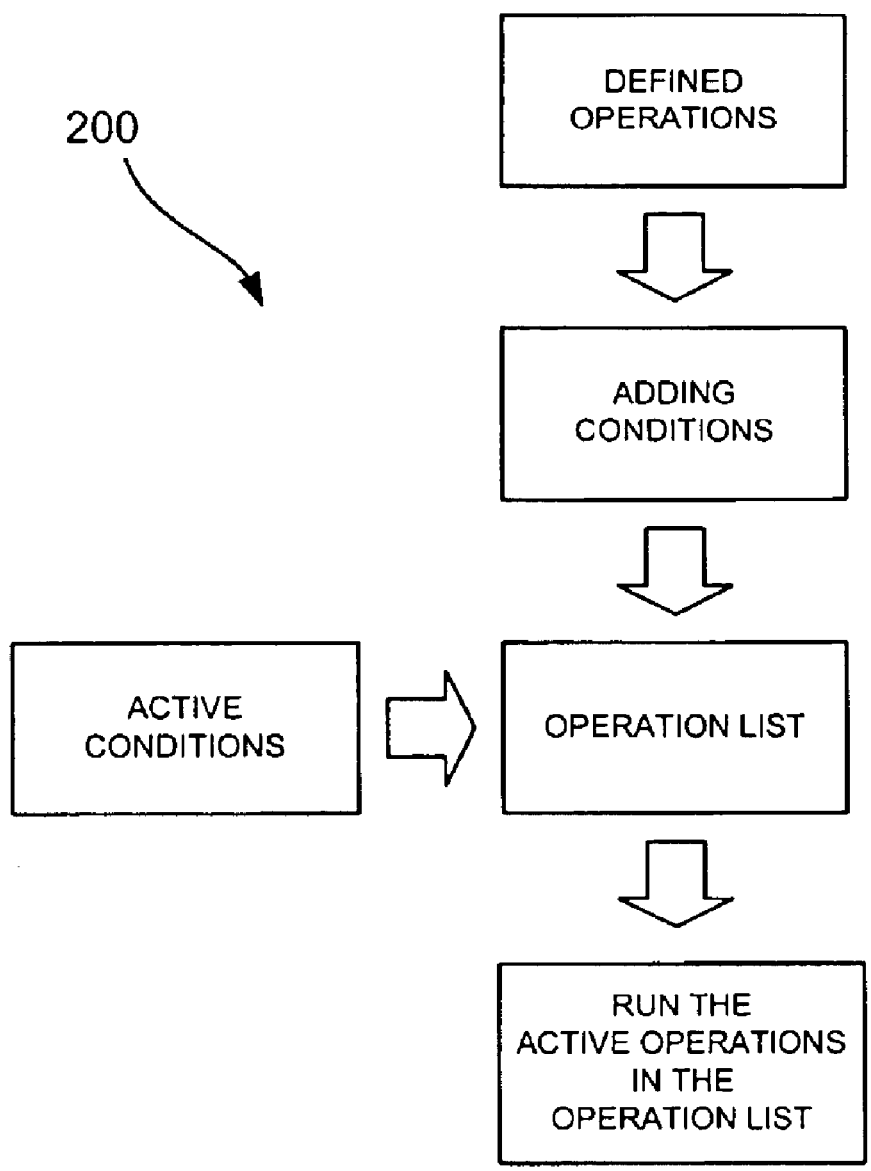
FIG. 2 shows the architecture of a scheduler in accordance with an embodiment of the present invention.

The architecture of a scheduler 200 in accordance with one embodiment of the invention is illustrated in FIG. 2. In scheduler 200, recipes, events, and other tasks that can be scheduled to run on the wafer processing system are all recognized as operations. Each operation follows a pre-defined data structure and includes information for running it. For example, a recipe operation includes a list of wafers to be processed and a sequence of actions for processing each wafer.

Before an operation can be scheduled to run, that operation must first meet certain requirements referred to as adding conditions. The adding conditions must be met to ensure that the operation can be run on the wafer processing system. Once an operation satisfies its adding conditions, that operation is added to an operation list. Newly added operations in the operation list are initially in the inactive state.

Scheduler 200 goes through each operation in the operation list and runs those that are in the active state. To be in the active state, an operation must meet additional requirements referred to as active conditions. An operation that meets its active conditions is ready to run, and can thus be activated.

Operations

There are different types of operations supported by scheduler 200.

A recipe operation includes a sequence of actions for performing fabrication steps on a semiconductor wafer. Recipes for the chemical vapor deposition, physical vapor deposition, etching, or electro-deposition of wafers are some examples of recipe operations.

Figure 1A:
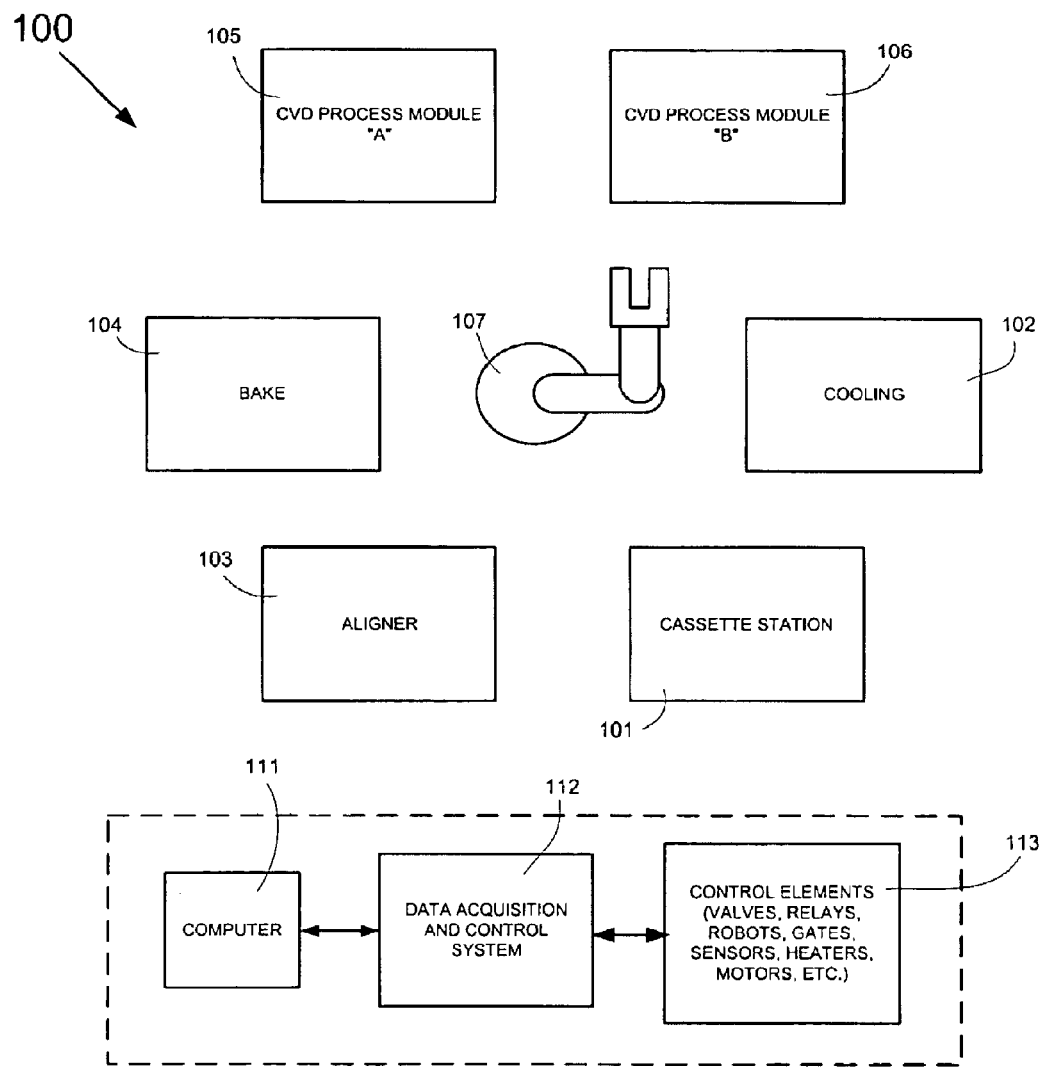
FIG. 1A shows a schematic diagram of a wafer processing system in the prior art.
Figure 1B:
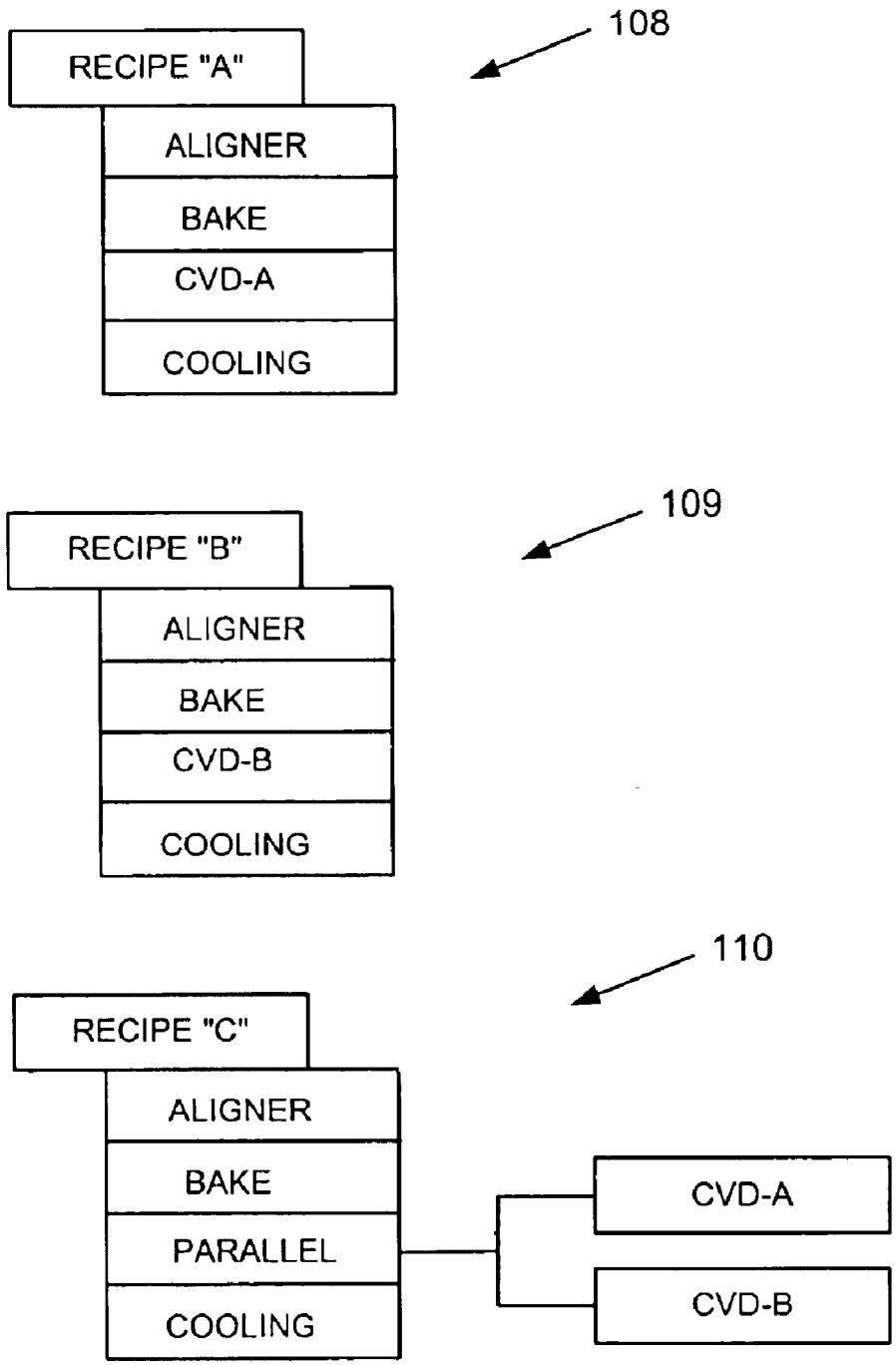
FIG. 1B shows recipes in the prior art.

Scheduler 200 also supports operations that do not include fabrication steps (non-recipe operations). One such operation is referred to as a purge operation, which involves the removal of all wafers from the wafer processing system. Purge operations are performed when the movement and processing of wafers have to be abruptly terminated. For example, if computer 111 shown in FIG. 1B encounters an irrecoverable error while running a recipe, a purge operation is performed to return all wafers back to their respective wafer cassettes regardless of whether or not the wafers have been completely processed. This allows a maintenance person to troubleshoot system 100 without the risk of destroying the wafers.

A reload operation, another non-recipe operation, is the reverse of a purge operation. A reload operation returns purged wafers back to their locations prior to the purge to continue their processing.

Other examples of non-recipe operations supported by scheduler 200 include shutdowns, process module clean, cassette mapping, and macro operations. Of course, scheduler 200 is not limited to any particular type of operation and can be adapted to run other operations specific to particular wafer processing systems.

Figure 3A:
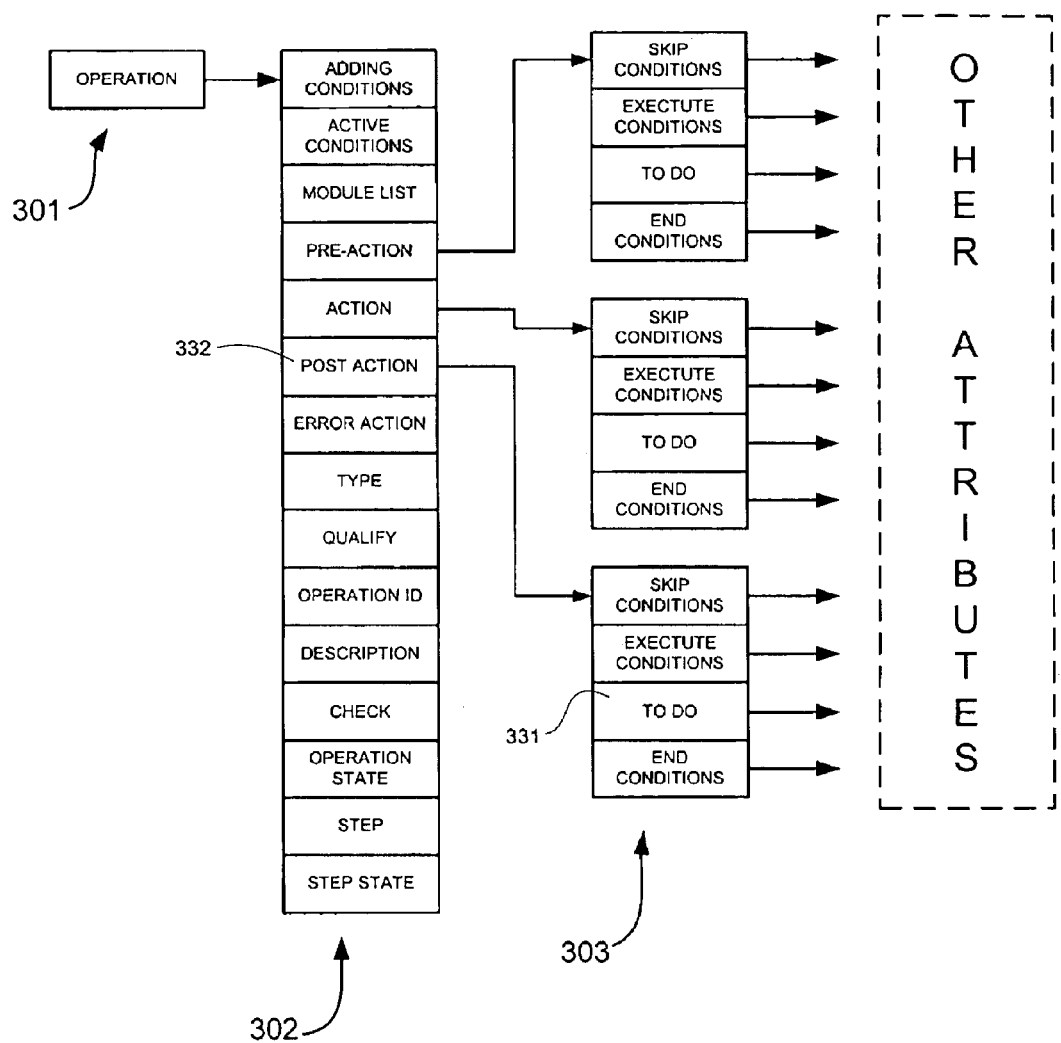
FIG. 3A shows the data structure of an operation in accordance with an embodiment of the present invention.

FIG. 3A pictorially illustrates the data structure of an operation 301, which is representative of all operations supported by scheduler 200 in one embodiment. Operation 301 (e.g., recipe operation, purge operation . . . ) has attributes 302, which in turn can have attributes 303 and so on. Each attribute is accessed using conventional object-oriented programming techniques. For example, the attribute To Do 331 of the attribute Post Action 332 of operation 301 can be accessed using the syntax "Operation.PostAction.ToDo" in the C++ programming language or the syntax "Operation:Postaction:ToDo" in the MACSE programming language. Table 1 provides a description of each of attributes 302.

TABLE 1

| ATTRIBUTE | DESCRIPTION |
|---|---|
| Adding Conditions | Conditions that must be met before the operation can be added to the operation list. |
| Active Conditions | Conditions that must be met before the operation can be switched to the active state. Only active operations are run in the operation list. |
| Module List | Contains a list of modules involved in the operation. |
| Pre-Action | Actions that need to be performed before running the actions contained in the Action attribute. The Pre-Action attribute further includes the following attributes:<br>(a) Skip Conditions—Conditions for skipping the Pre-Action attribute.<br>(b) Execute Conditions—Conditions for executing a block of actions contained in the To Do attribute (see immediately below).<br>(c) To Do—The block of actions to be performed.<br>(d) End Conditions—Conditions for terminating the Pre-Action attribute. |
| ACTION | The main actions that need to be performed. The Action attribute further includes the following attributes:<br>(a) Skip Conditions—Conditions for skipping Action attribute.<br>(b) Execute Conditions—Conditions for executing a block of actions contained in the To Do attribute (see immediately below).<br>(c) To Do—The block of actions to be performed.<br>(d) End Conditions—Conditions for terminating the Action attribute. |
| POST ACTION | Actions that need to be performed following the Action attribute. The Post Action attribute further includes the following attributes:<br>(a) Skip Conditions—Conditions for skipping the Post Action attribute.<br>(b) Execute Conditions—Conditions for executing a block of actions contained in the To Do attribute (see immediately below).<br>(c) To Do—The block of actions to be performed.<br>(d) End Conditions—Conditions for terminating the Post Action attribute. |
| ERROR ACTION | Error recovery actions that need to be performed if the operation is not successfully completed. |
| TYPE | Indicates the operation type (e.g., recipe operation, purge operation . . . ) |
| QUALIFY | For a recipe operation, the Qualify attribute indicates whether the recipe is a test recipe (also, known as a qualifying recipe). A test recipe is run to ensure that the wafer processing system is functioning properly. When the Qualify attribute is a logical "1" (i.e., TRUE), indicating that a test recipe is running, all other operations are switched to the suspended state. |
| OPERATION ID | A unique identification for keeping track of the operation. |
| DESCRIPTION | Contains a description of the operation. |
| CHECK OPERATION STATE | Indicates whether the operation needs to be rechecked. Indicates whether the operation is in the inactive, active, or suspended state. |

TABLE 1-continued

| ATTRIBUTE | DESCRIPTION |
|---|---|
| STEP | Indicates whether the operation is in the pre-action, action, or post action step. Actions for each operation step is contained in their namesake attributes. For example, actions for the pre-action step are in the Pre-Action attribute. |
| STEP STATE | Indicates the state of the step the operation is in. Each operation step can be in any of the following states:<br>(a) Checking skip conditions<br>(b) Awaiting execute conditions<br>(c) Executing the block of actions in the To Do attribute or<br>(d) Awaiting end conditions |

The number and type of attributes needed for any given operation depend on the actions to be performed by the operation. Thus, some operations may use only a portion of the attributes shown in Table 1, while other operations may require attributes not specifically enumerated therein. For example, recipe operation 304 shown in FIG. 3B does not have an Adding Conditions attribute because, in this particular embodiment, recipe operations are always added to the operation list.

Figure 3B:
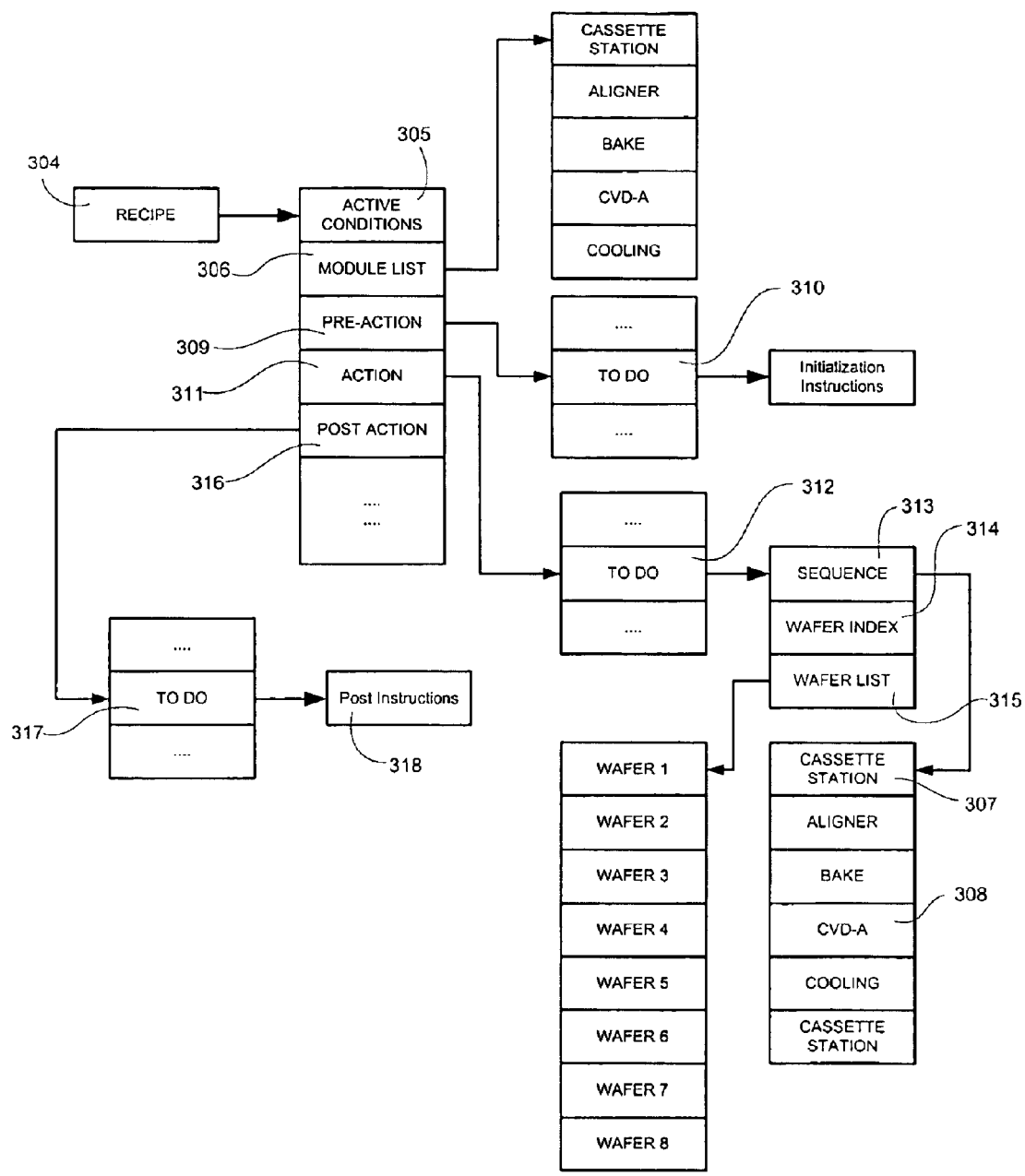
FIG. 3B shows the data structure of a recipe operation in accordance with an embodiment of the present invention.

Referring to FIG. 3B, the attribute Active Conditions 305 of recipe operation 304 contains requirements that must be met before recipe operation 304 can be switched to the active state. In one embodiment, an active condition of recipe operation 304 is dependent on the mode scheduler 200 is operating in. When scheduler 200 is in Simultaneous mode, whereby compatible recipe operations are scheduled to run at the same time, Active Conditions 305 contains a requirement that recipe operation 304 can be switched to the active state only if it is compatible with currently active recipe operations. If scheduler 200 is not in Simultaneous mode, only one recipe operation is allowed to run at any given time. In that case, Active Conditions 305 contains a requirement that recipe operation 304 can be switched to the active state only if there is no active recipe operation in the operation list.

Active Conditions 305 also contains a requirement that a recipe operation cannot be switched to the active state if a hard shutdown signal (e.g., from a mechanical switch actuated by a human operator) has been received.

The attribute Module List 306 of recipe operation 304 contains a list of modules involved in the operation. This allows other components of the wafer processing system to find out which modules are to be used and need to be set-up for the operation.

The attribute Pre-Action 309 of recipe operation 304 includes an attribute To Do 310, which contains initialization instructions to be performed prior to performing the block of actions contained in attribute Action 311.

The attribute Action 311 of operation 304 includes an attribute To Do 312, which contains further attributes for performing fabrication steps. Sequence 313 contains a block of actions for cycling a wafer through the various modules of a wafer processing system. In the example shown in FIG. 3B, sequence 313 performs the actions of recipe 108 previously discussed (see FIG. 1B). In accordance with sequence 313, a wafer from a wafer cassette in a cassette station is transferred to an aligner. Thereafter, the wafer is pre-heated in a bake module, processed in CVD process module "A", cooled in a cooling station, and then returned back to its wafer cassette in the cassette station. It is to be noted that techniques for directing the operation of modules to perform specific tasks are well known. Using the attribute cassette station 307 of sequence 313 as an example, control programs for directing a robot to pick up a wafer from a wafer cassette and moving the wafer to an aligner are readily available. Using the attribute CVD-A 308 as another example, the design of a control program to place a wafer on a pedestal under a shower head and introduce process gases into a process module is well within the knowledge of persons of ordinary skill in the art. In wafer processing system 100 shown in FIG. 1A, such control programs run on computer 111, and direct control elements 113 via data acquisition and control system 112.

Referring back to FIG. 3B, the attribute Wafer List 315 enumerates the wafers to be processed in accordance with recipe operation 304. The attribute Wafer Index 314 indicates which wafer listed in Wafer List 315 is currently being processed.

The attribute Post Action 316 of recipe operation 304 includes an attribute To Do 317, which contains instructions to be performed after Action 311 has completed.

Of course, other operations which conform to the data structure of operation 301 shown in FIG. 3A can also be defined.

Figure 3C:
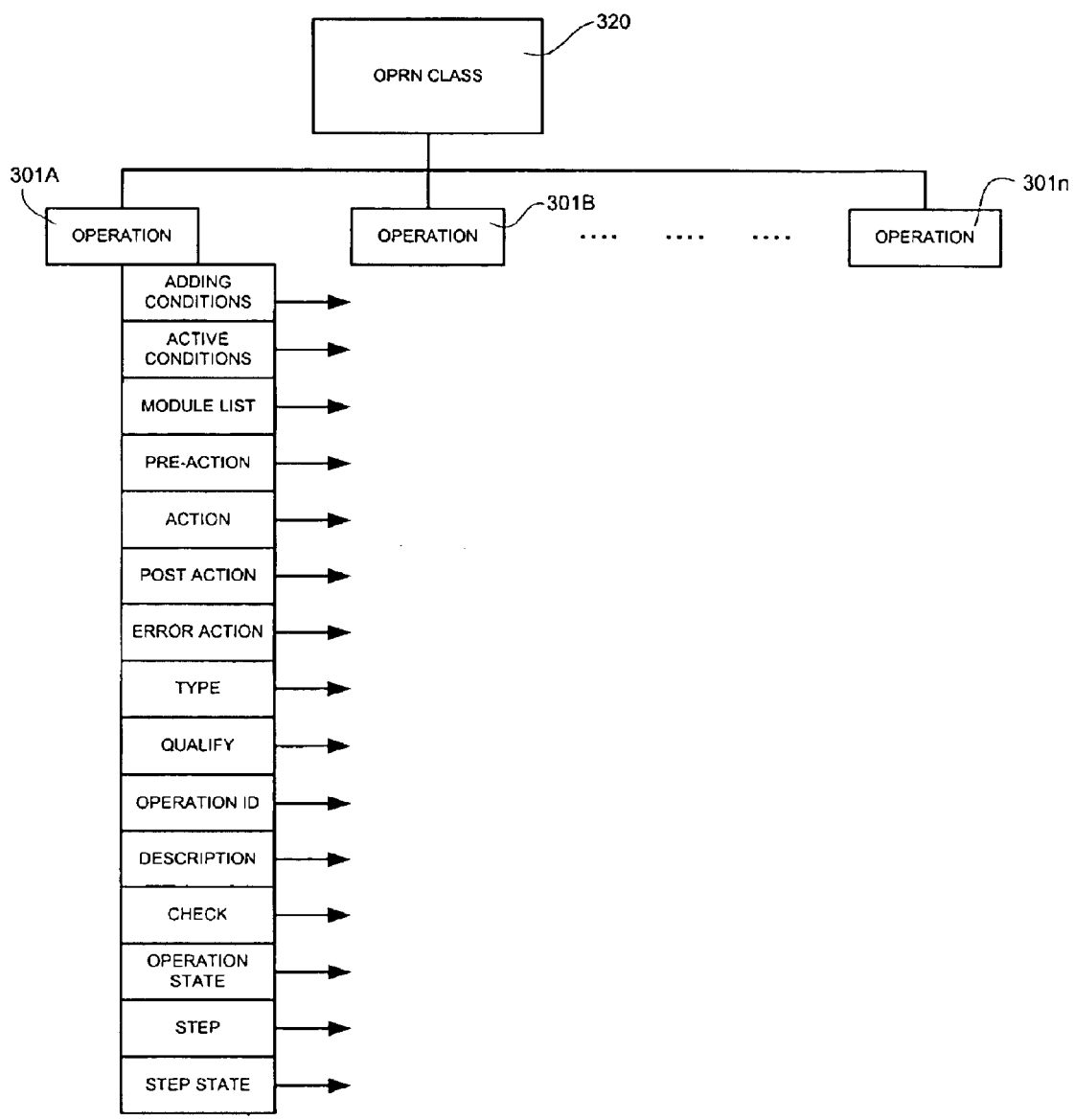
FIG. 3C shows the organization of operations in the present scheduler.

FIG. 3C pictorially illustrates the organization of operations in scheduler 200. In one embodiment, all defined operations (i.e. operations 301A, 301B, . . . 301n) are stored as objects under a class OPRN 320. All operations have attributes, which in turn can have additional attributes as discussed above. All defined operations are loaded into memory when the scheduler task is started.

The extensibility and maintainability of the present scheduler are improved by using structured operations to perform tasks. Because the present scheduler can run any operation that conforms to the data structure, new operations can be created without having to maker changes to the scheduler itself. Further, functionality that is common to all operations can be incorporated in the scheduler rather than in the individual operations. This simplifies the maintenance of the scheduler not only by reducing the number of lines of codes that have to be supported, but also by allowing the scheduler to be isolated from an operation during troubleshooting sessions.

Adding Operations to the Operation List

Figure 4A:
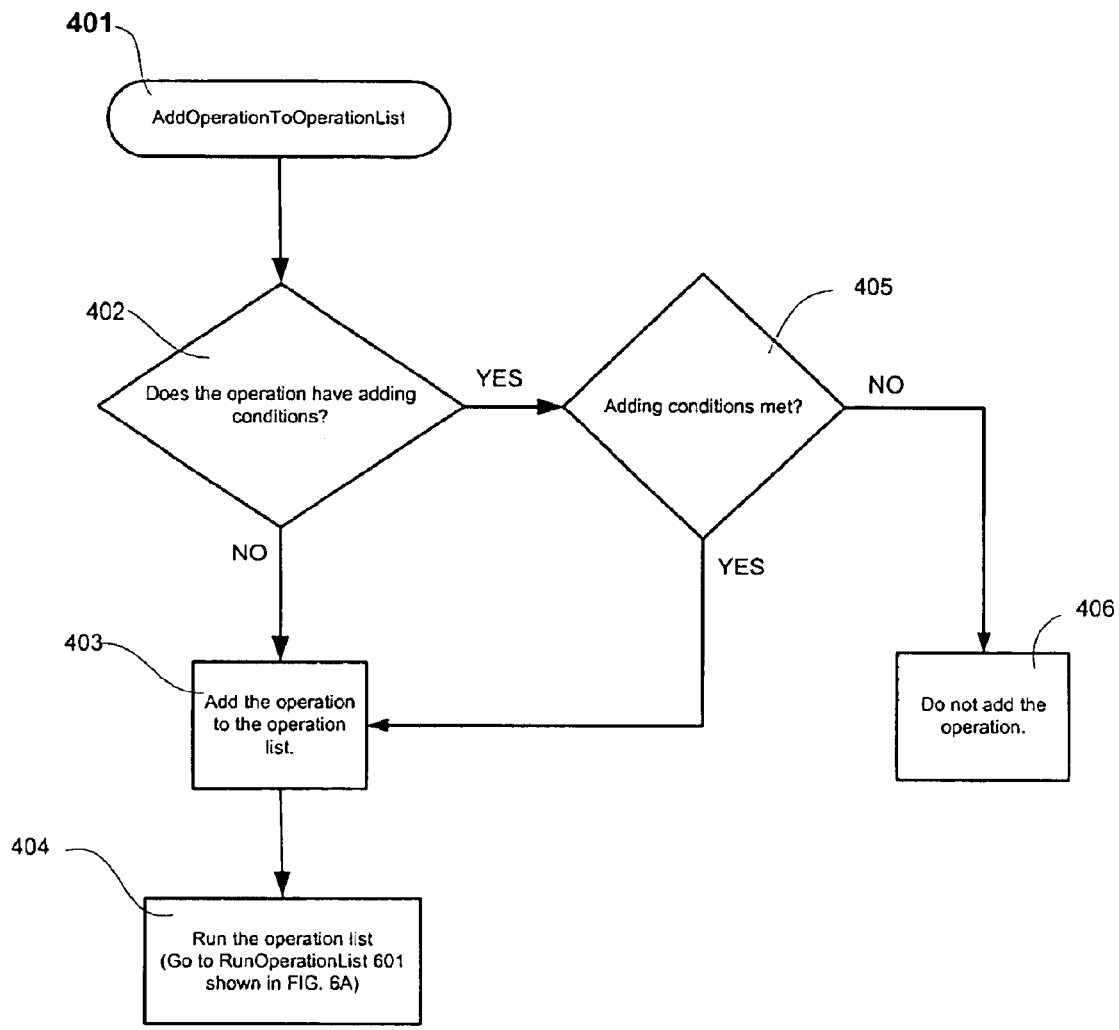
FIG. 4A shows a method for adding an operation to an operation list in accordance with an embodiment of the present invention.

A method for adding an operation to an operation list, referred to as AddOperationToOperationList 401, is shown in FIG. 4A. In step 402, a determination is made as to whether the operation has adding conditions. If not, the operation is added to the operation list (step 403).

Figure 4B:
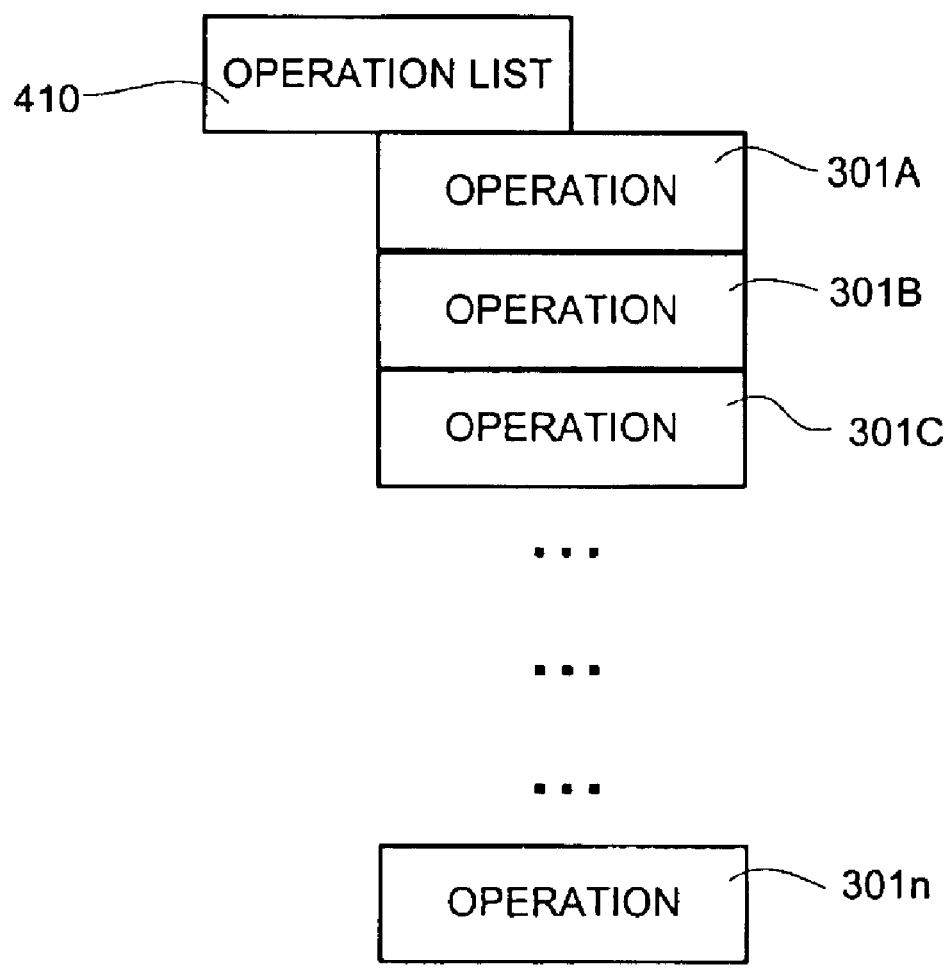
FIG. 4B shows a pictorial representation of operations in an operation list.

If the operation to be added has adding conditions and the adding conditions have been met, the operation is added to the operation list (step 405, step 403). Otherwise, the operation is not added (step 406). FIG. 4B pictorially illustrates operations 301A, 301B, 301C, . . . 301n added to operation list 410.

In the case where an operation has just been added to the operation list, another method, referred to as RunOperationList 601, is performed to check if the newly added operation can be run (step 404, FIG. 4A). RunOperationList 601 is further discussed below with reference to FIG. 6A.

Activating Operations in the Operation List

Operations in the operation list can be in the active, inactive, or suspended state. Initially, a newly added operation is placed in the inactive state. Once that operation meets all of its active conditions, it is then switched to the active state. As previously discussed, only active operations in the operation list are scheduled to run.

An operation is placed in the suspended state when any of the modules involved in the operation is in error, needs maintenance, or is in the middle of a reload operation. A suspended operation is not allowed to directly transition to the active state because that operation's active conditions need to be reevaluated to ensure the operation can be properly run. Thus, a suspended operation can only transition to the inactive state.

Figure 5:
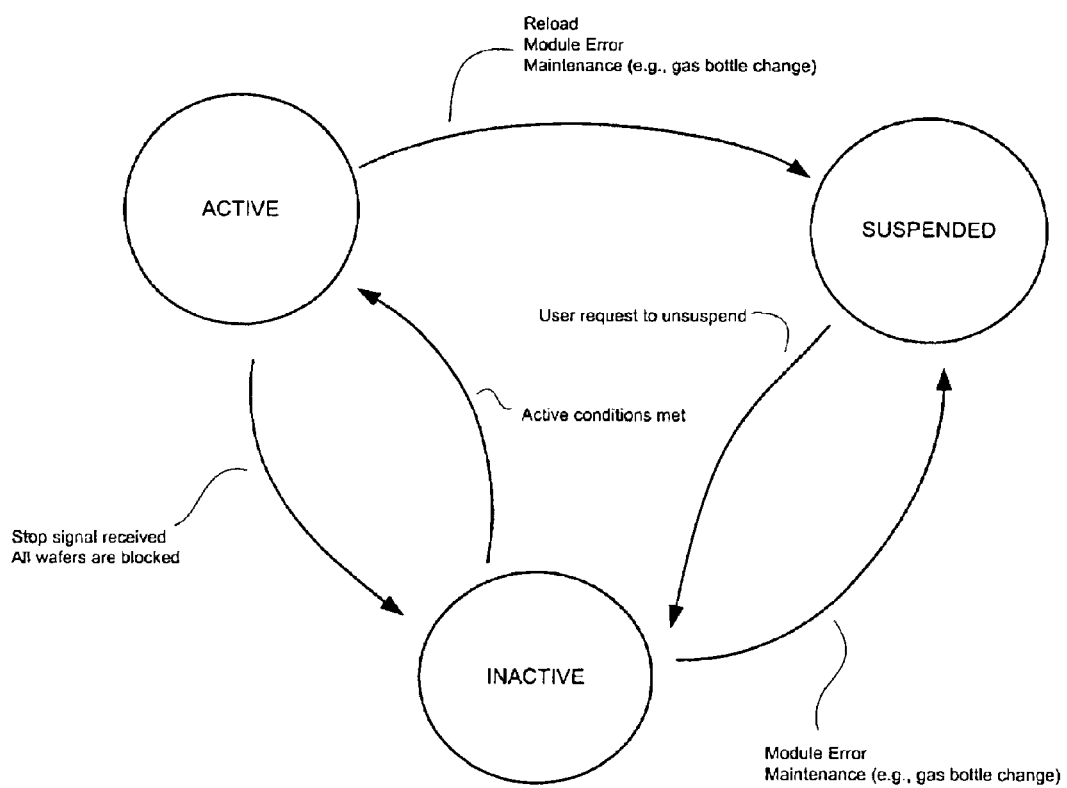
FIG. 5 shows an operation state transition diagram in accordance with an embodiment of the present invention.

An operation state transition diagram in one embodiment is provided in FIG. 5.

Running the Operations in the Operation List

Figure 6A:
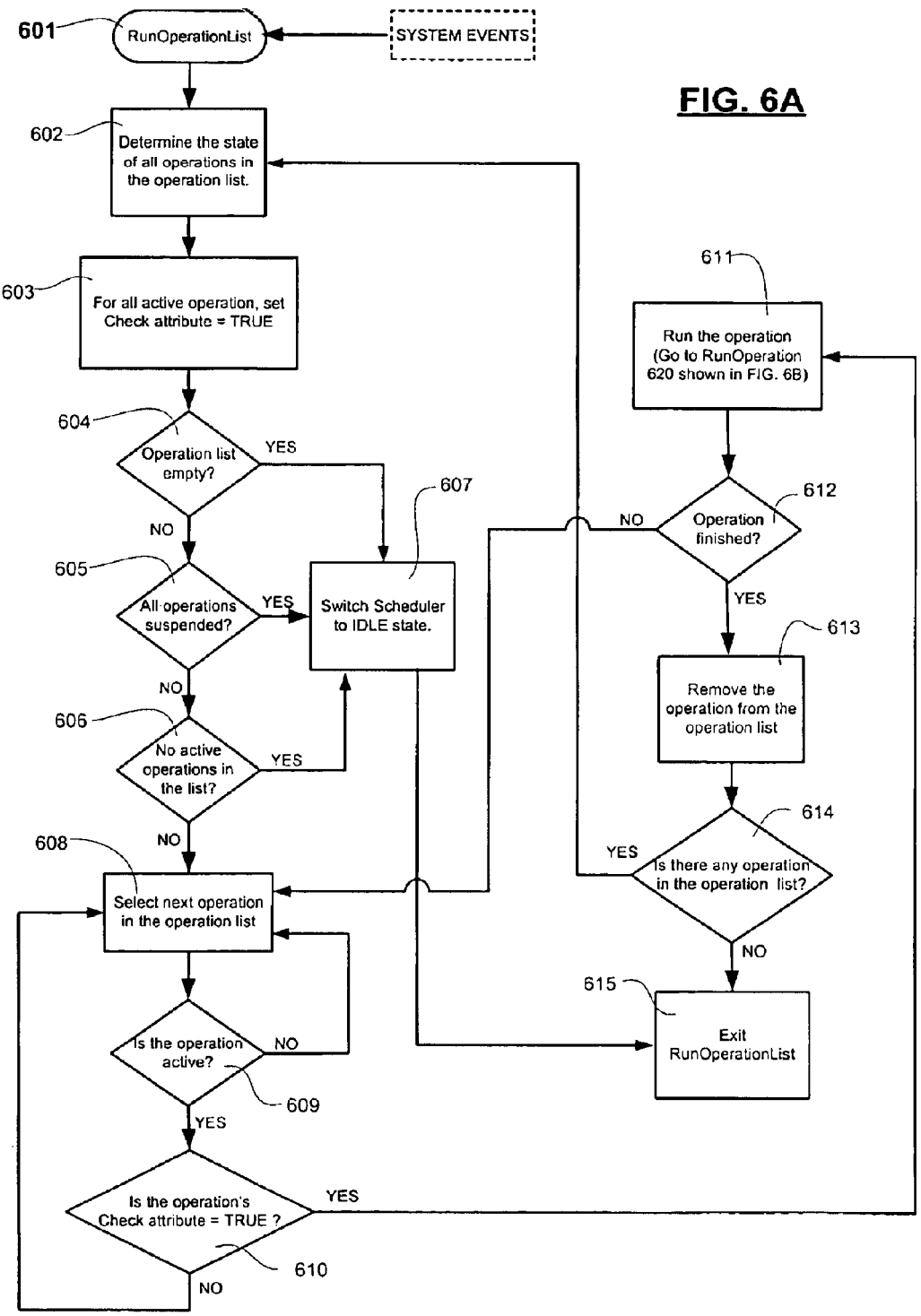
FIG. 6A shows a method for coordinating the running of operations in an operation list in accordance with an embodiment of the present invention.

FIG. 6A shows RunOperationList 601, a method for coordinating the running of operations in an operation list. The method RunOperationList 601 is invoked whenever a system event which indicates there is an operation in the operation list is received. An example of such a system event is the addition of an operation to the operation list (see step 404, FIG. 4A) or the loading of a new wafer cassette in the cassette station. In step 602, the state of each operation in the operation list is determined. The Check attribute (see Table 1, FIG. 3A) of all active operations is set to a logical value of TRUE to indicate that the operation needs to be checked later on in the method (step 603). The Check attribute of all other operations is set to FALSE. The scheduler is placed in the idle state (step 607) if the operation list does not have any operations (step 604), or if all operations are in the suspended state (step 605), or if there are no active operations in the operation list (step 606). Otherwise, the next operation in the operation list is selected for running (step 608). If the just selected operation is not in the active state, another operation is selected from the list (step 609, step 608).

Figure 6B:
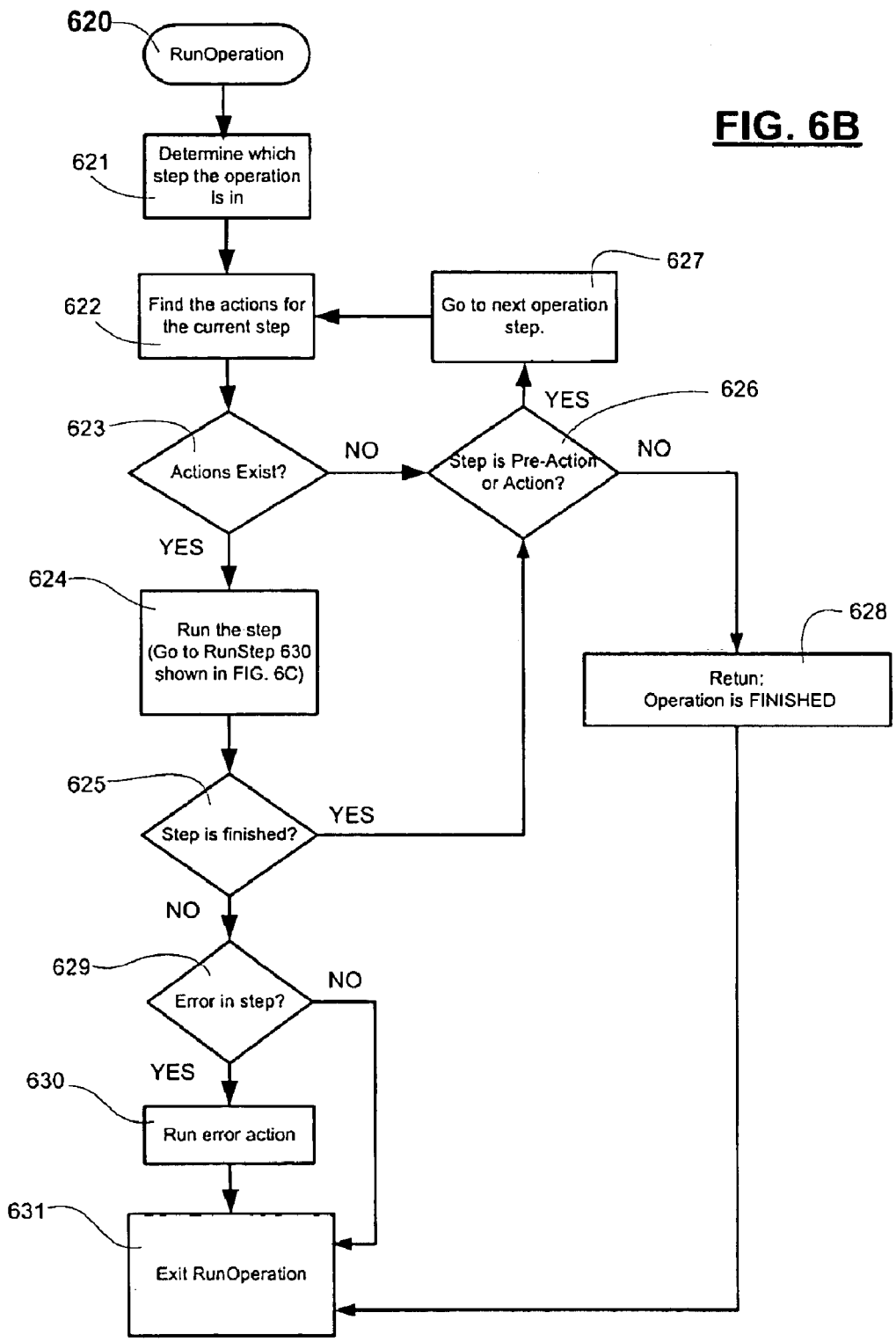
FIG. 6B shows a method for running an operation in accordance with an embodiment of the present invention.

If the selected operation is active and its Check attribute has a logical value of TRUE, the operation is run using the method RunOperation 620 shown in FIG. 6B (step 611). The operation is removed from the operation list upon its completion (step 612, step 613). Thereafter, the method RunOperationList 601 is repeated for the next operation in the list (step 614, step 602, step 603, . . . ). RunOperationList 601 is then exited if there are no operations left in the operation list (step 614, step 615).

As indicated in step 612 and step 608, another operation is selected from the list even if the previously selected operation has not completed. Thus, another active operation can be run while the previously selected operation is still running. The previously selected operation will be rechecked in step 611 on its next turn to be selected as long as it remains in the operation list. The capability of the present scheduler to coordinate the running of several operations at the same time improves the throughput of the wafer processing system.

In one embodiment, each operation can be either in the pre-action, action, or post action step (hereinafter "operation step"). When the block of actions in the Pre-Action attribute of the operation is being performed, the operation is in the pre-action step; when the block of actions in the Action attribute of the operation is being performed, the operation is in the action step, and so on. An operation transitions in the following order: (1) pre-action step, (2) action step, (3) post-action step.

FIG. 6B shows RunOperation 620, a method for running operations that were selected to run by the method RunOperationList 601 (see FIG. 6A, step 611). In step 621, the step the operation is currently in is determined by, for example, reading the Step attribute of the operation (see Table 1, FIG. 3A). If the current operation step includes a block of actions (steps 622, 623), the block of actions are run (step 624) using the method RunStep 630 shown in FIG. 6C.

If the return value from the method RunStep 630 indicates that it has completed (step 625), and if the just completed operation step is not a pre-action or action step (step 626) (i.e., the just executed operation step is post-action), a return value is provided to the calling method indicating that the operation has finished (step 628). This return value is used by the method RunOperationList 601 (see step 612, FIG. 6A) to determine if the operation is finished and can be removed from the operation list. After setting its return value, RunOperation 620 is then exited (steps 628, 631).

The next operation step is selected if the return value from the method RunStep 630 indicates that it has completed, and if the just completed operation step is the pre-action or action step (steps 625, 626, 627).

It the return value from the method RunStep 630 indicates that it has not completed but no errors were encountered, the method RunOperation 620 is exited (steps 629, 631). Otherwise, error recovery actions contained in the attribute Error Action are performed (see Table 1, FIG. 3A) (step 630).

Figure 6C:
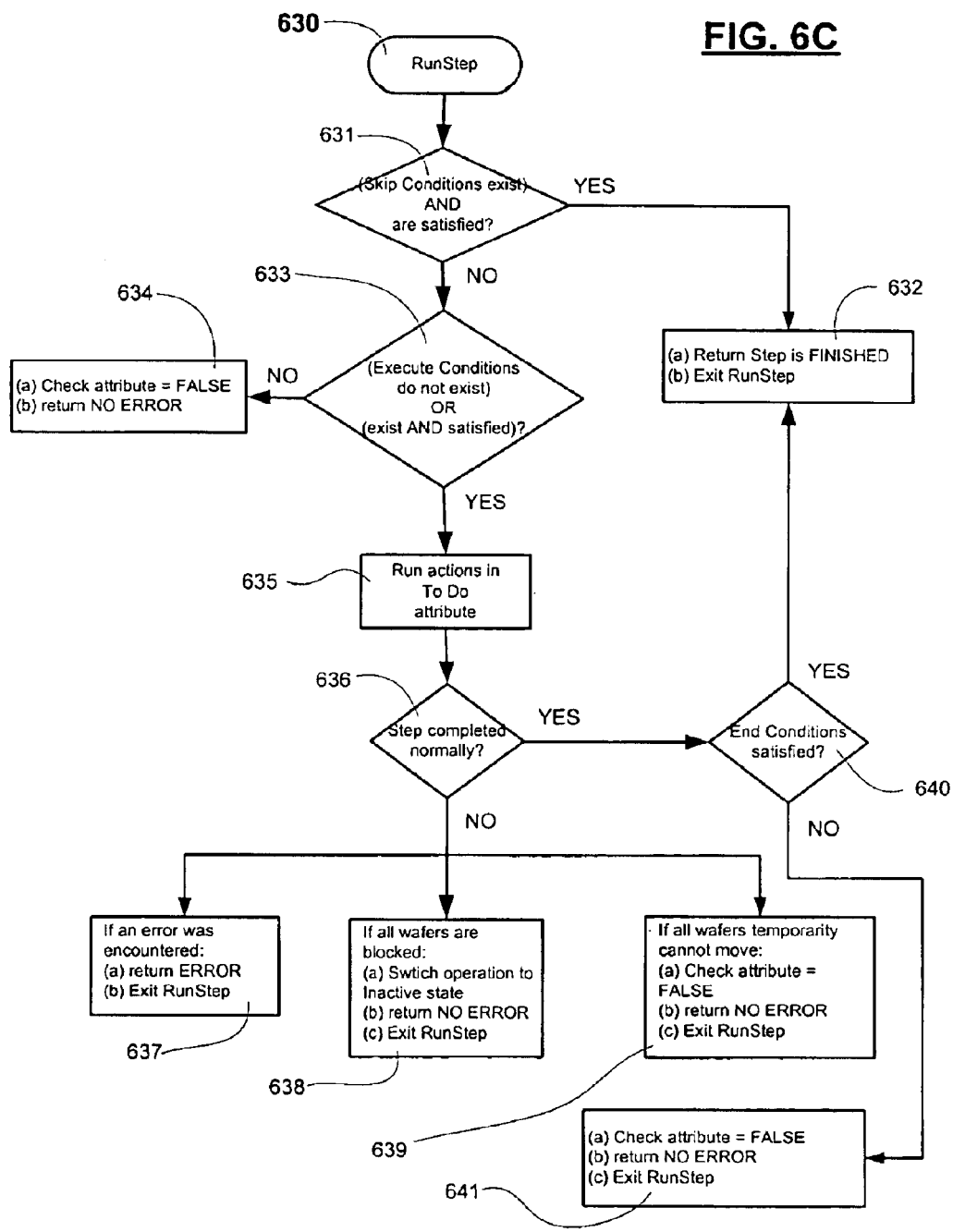
FIG. 6C shows a method for running an operation step in accordance with an embodiment of the present invention.

FIG. 6C shows RunStep 630, a method for running an operation step. RunStep 630 begins by determining whether the current operation step has skip conditions, which are stored in the Skip Conditions attribute, and whether the skip conditions have been satisfied (step 631). If so, a return value indicating the step has completed is provided to the calling method, and the method RunStep 630 is exited (step 632). The return value is used by RunOperation 620 in step 625 (see FIG. 6B) to determine if the operation step is finished.

In the case where the skip conditions are not satisfied, it is determined whether the execute conditions, which are stored in the Execute Conditions attribute, are satisfied (step 633). If not, the Check attribute of the operation is set to FALSE and the return value provided to the calling method indicates that no error was encountered while running the operation step (step 634). Failure to meet the execute conditions means that the operation step is waiting for certain events, such as for a busy module to become available, to occur. By setting the operation's Check attribute to FALSE and exiting RunStep 630 when the operation has to wait, other currently active operations are given the chance to complete. This improves the efficiency of the present scheduler when coordinating simultaneous active operations.

Referring back to FIG. 6A for a moment, note that RunOperationList 601 will continue to be performed as long as there are operations in the operation list (see step 614, step 602, step 603, . . . ). Thus, an operation with an operation step that does not meet execute conditions will be run again at some point.

Referring to FIG. 6C, the actions contained in the To Do attribute of the current operation step are performed when all of its execute conditions are satisfied or when there are no execute conditions (steps 633, 635). If the actions in the To Do attribute of the operation step completed normally (i.e., without errors) and all requirements contained in the End Conditions attribute are satisfied, a return value indicating the operation step has finished is provided to the calling method and RunStep 630 is exited (steps 636, 640, 632).

If an error occurred while running the actions of the operation step, a return value which so indicates is provided to the calling method (step 637).

If all wafers involved in the actions are blocked because of a failed module, for example, the operation is switched to the inactive state (step 638). The return value provided to the calling method indicates that no error occurred to prevent the calling method from running error recovery actions contained in the Error Action attribute. This allows other operations which do not use the failed module to continue to run.

If all wafers involved in the actions temporarily cannot move (e.g., a module is busy processing other wafers), the Check attribute of the operation is set to FALSE and RunStep 630 is exited. Again, this improves the efficiency of the scheduler by allowing other active operations to run when the currently active operation is waiting (step 639).

In the case where the actions contained in the To Do attribute of the operation step has completed normally but the requirements contained in the End Condition attributes are not satisfied, the Check attribute of the operation is set to FALSE and RunStep 630 is exited also give other operations the chance to run (steps 636, 640, 641). The return value provided to the calling method indicates that no error occurred because failing to meet end conditions means that the operation step is waiting for an event to occur, not that an error was encountered.

CONCLUSION

A method for scheduling tasks in a wafer processing system has been described. While specific embodiments have been discussed, it is to be understood that these embodiments are provided for illustration purposes and not limiting. Many other embodiments in accordance with the teachings of this disclosure will be readily apparent to persons of ordinary skill in the art.

What is claimed is:

1. A method for scheduling tasks in a wafer processing system comprising:

defining a plurality of operations that can be run on said wafer processing system;

adding at least one of said plurality of operations to an operation list;

switching an operation in said operation list to an active state; and scheduling all operations in said operation list that are in the active state to run on said wafer processing system.

2. The method of claim 1 wherein each of said plurality of operations includes conditions for adding an operation to said operation list.

3. The method of claim 1 wherein each of said plurality of operations includes conditions for switching an operation in the operation list to an active state.

4. The method of claim 1 wherein said plurality of operations includes a recipe operation.

5. The method of claim 1 wherein said plurality of operations includes a recipe operation and a non-recipe operation.

6. A wafer processing system including a computer, said computer having a computer readable storage memory containing a plurality of operations that can be run on said wafer processing system, said computer readable storage memory further containing instructions for (a) adding at least one of said plurality of operations to an operation list, (b) switching an operation in said operation list to an active state, and (c) scheduling all operations in said operation list that are in the active state to run, wherein at least one operation in the operation list including a sequence of actions for performing fabrication steps on a semiconductor wafer.

7. The wafer processing system of claim 6 wherein each of said plurality of operations includes conditions for adding an operation to said operation list.

8. The wafer processing system of claim 6 wherein each of said plurality of operations includes conditions for switching an operation in the operation list to an active state.

9. The wafer processing system of claim 6 wherein at least one of said plurality of operations is a recipe operation.

10. A data structure for an operation to be performed on a wafer processing system comprising:

a first level including conditions for adding said operation to an operation list and conditions for switching said operation to an active state, said operation list including at least one operation for performing fabrication steps on a semiconductor wafer; and a second level including a sequence of actions to be performed on said wafer processing system.

11. The data structure of claim 10 wherein said first level further includes a list of modules to be used by said operation, at least one module in the list of modules including a wafer processing chamber.

12. The data structure of claim 10 wherein said operation is a recipe operation.

13. The data structure of claim 12 wherein said second level further includes a list of wafers to be processed in accordance with said recipe operation.

* * * * *